Nov. 20, 1962

R. C. MIERENDORF 3,065,385

ELECTRICAL ASSEMBLY

Filed Jan. 4, 1960

2 Sheets-Sheet 1

INVENTOR.
ROBERT C. MIERENDORF
BY
William H. Schmeling

Nov. 20, 1962

R. C. MIERENDORF 3,065,385

ELECTRICAL ASSEMBLY

Filed Jan. 4, 1960

2 Sheets-Sheet 2

INVENTOR.
ROBERT C. MIERENDORF
BY
William H. Schmeling

United States Patent Office 3,065,385

Patented Nov. 20, 1962

3,065,385

ELECTRICAL ASSEMBLY

Robert C. Mierendorf, Wauwatosa, Wis., assignor to Square D Company, Detroit, Mich., a corporation of Michigan Filed Jan. 4, 1960, Ser. No. 218

8 Claims. (Cl. 317—101)

This invention relates to the construction of electrical devices and more particularly, to the physical arrangement of a plurality of radio-type components which are encapsulated in a housing to provide an assembly which is particularly suited for use in logic circuits in industrial applications.

Conventional radio-type components, such as resistors, capacitors, transistors, diodes and the like are frequently employed in logic systems. While the techniques of manufacture has progressed so the components may be considered reliable, the extreme fragility of the components has deterred their use in industrial circuits. Another deterrent to the acceptance of radio-type components in industrial practices is the adverse psychologic effect created in the minds of maintenance personnel. The introduction of electronic circuits in industrial control circuits is of relatively recent origin and when the average maintenance man is requested to service a circuit containing a large number of the above mentioned components, he immediately assumes upon viewing the circuit that the circuit is complicated and incapable of ready repair. It is therefore an object of the present invention to overcome the objections to the use of radio-type components in industrial installations by providing an assembly, and the method of making the same, wherein advantage is taken of the reliability of the present day radio components and a large number of fragile components are protected and completely concealed so the device may be used in industrial logic circuits and electrical connections thereto may be made in accordance with accepted industrial techniques.

The assembly according to the present invention is characterized by its pleasing rugged appearance, the ease with which it may be manufactured and the compact, sturdy arrangement of the otherwise fragile parts prior to encapsulation in a housing.

A further object of the present invention is to provide an assembly of a plurality of electric circuit components, each of which has a pair of oppositely extending terminal leads, one of which is inserted through an opening in a printed circuit board into electrical engagement with a conductor extending along the bottom surface of the board and the other end of which has a tapered pin secured thereto receivable in a socket in a bottom surface of a terminal block and wherein the assembly includes a plurality of terminal blocks which are maintained side by side by the electrical components prior to being positioned and encapsulated in a housing which has a means engageable with the blocks for positioning the blocks in the housing prior to encapsulation and for protecting the assembly from the force exerted by the insertion of tapered pins into sockets in the top surface of the blocks when the assembly is wired into a logic circuit.

Further objects and features of the invention will be readily apparent to those skilled in the art from the specification and appended drawing illustrating certain preferred embodiments in which:

FIG. 1 schematically illustrates one of a plurality of typical logic circuits which may be incorporated in the assembly according to the present invention.

Figure 1:
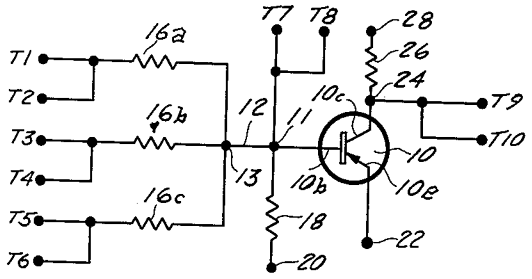
Figure 2:
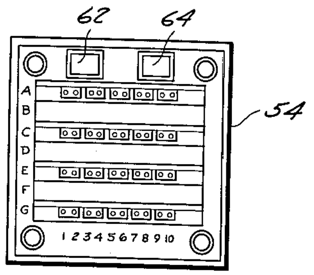
FIG. 2 is a top plan view of a complete assembly incorporating the features of the present invention.
Figure 3:
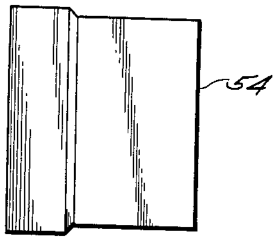
FIG. 3 is a side view of the assembly in FIG. 2.

In FIG. 1 of the drawings, one of a plurality of typical circuits which may be encapsulated in the assembly shown in FIG. 2 is schematically illustrated. The circuit shown in FIG. 1 is conventionally known as a "NOR" circuit and per se does not constitute a portion of the present invention. The components which will be hereinafter described in connection with the circuit shown in FIG. 1 will be given similar designations in FIG. 7, wherein the physical embodiments of the counterparts of the components illustrated schematically in FIG. 1 are shown.

Figure 7:
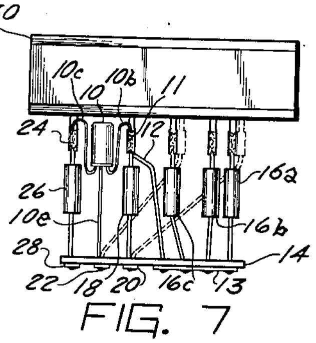
FIG. 7 is a view of the other end of the assembly in FIG. 5.
Figure 11:
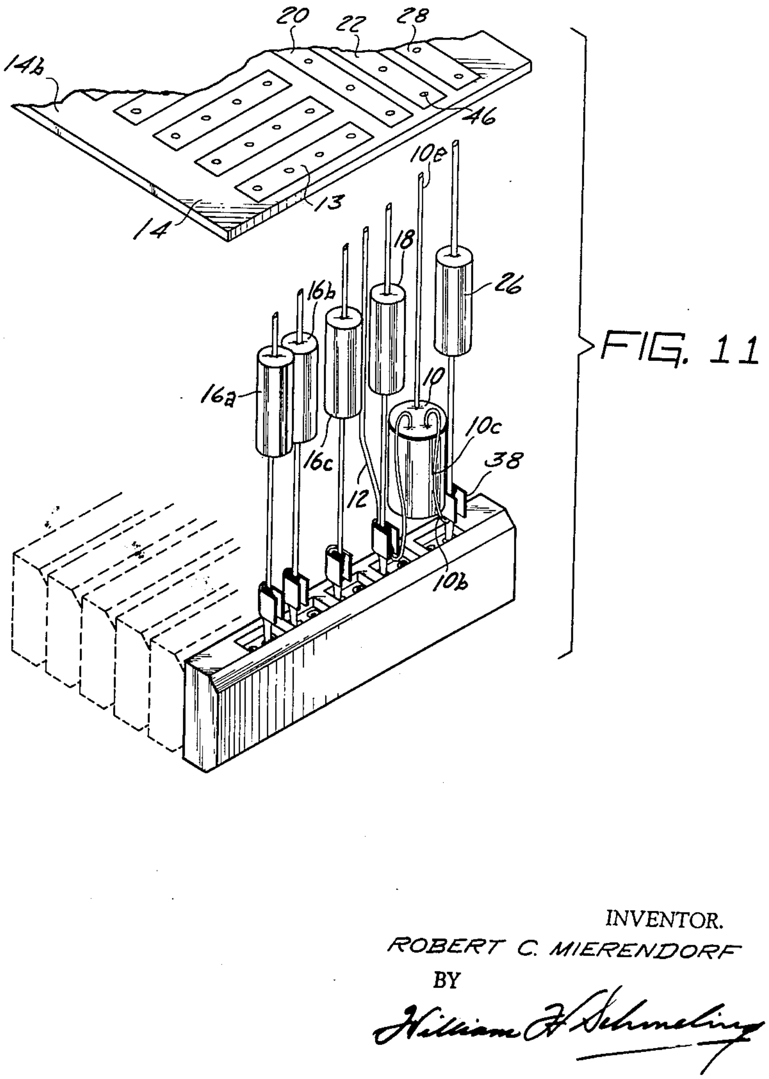
FIG. 11 is an exploded view showing the arrangement of certain of the components of the assembly according to the present invention during assembly thereof and wherein the components are shown in perspective and certain components are shown in phantom and other components illustrated as broken-away fragments.

The NOR circuit employs a pnp type transistor 10 having a base **10*b*, an emitter 10*e* and a collector 10*c*. The base 10*b* is connected through a junction 11 and a lead 12 to a junction 13. The junction 13 in FIGS. 7 and 11 is shown as one of the transverse buses of a printed circuit board 14. A pair of terminals T1 and T2 are electrically interconnected and connected through a resistor 16*a* to junction 13. Similar terminal pairs T3—T4 and T5—T6 are respectively electrically connected through resistors 16*b* and 16*c* to junction 13. A resistor 18 is connected between junction 11 and a termination 20 which in FIG. 11 is illustrated as a longitudinally extending bus on the printed circuit board 14. The emitter 10*e* is connected to a termination 22 which in FIG. 11 is illustrated as a longitudinally extending bus 22 on the printed circuit board 14. The collector 10*c* is connected to a junction 24 which in turn is connected through a resistor 26 to a termination 28 that is shown in FIG. 11 as a longitudinally extending bus 28 on the printed circuit board. Also connected to junction 24 are terminals T9 and T10 and connected to junction 11 are terminals T7 and T8.**

Figure 12:
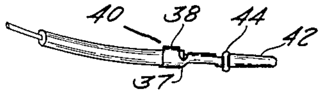
FIG. 12 is a view of a tapered pin which is received in the sockets in the blocks shown in FIGS. 8–10.
Figure 8:
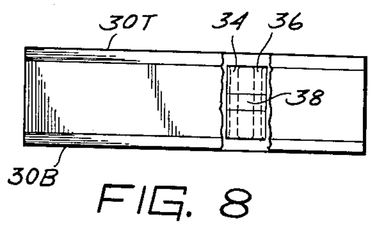
FIG. 8 is a side view of the terminal blocks as used in the assembly in FIG. 5, with a portion thereof broken away to illustrate the electrical connections and arrangement of the taper pin receiving sockets.
Figure 9:
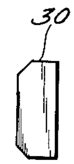
FIG. 9 is an end view of the terminal block in FIG. 8.
Figure 10:
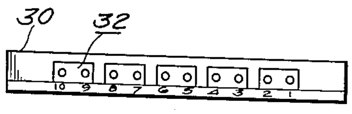
FIG. 10 is a view showing the top or bottom surface of the terminal block in FIG. 8.

FIGS. 8–10 illustrate one form of a support which may be used in the structure according to the present invention. The support shown includes a plurality of terminal blocks 30 which are used in the assembly shown in FIG. 2. While it is apparent that the individual blocks can be combined to form a single block with the proper number of terminations thereon, the individual terminal blocks 30 provide greater manufacturing flexibility and are preferably formed of a suitable molded plastic material to have an elongated rectangular shape. The individual blocks 30 are stacked side by side as shown in FIG. 11 to provide a row of blocks. Each of the blocks 30 have a plurality of suitable electrical connectors which are shown as tapered pin receiving sockets which are spaced in a row and extend between the top surface 30t and the bottom surface 30b. The sockets 32 are formed by embedding suitably shaped metal inserts 33 in the molding material during the molding of the blocks 30. The inserts are shaped to receive pins 37 having a tapered end as shown in FIG. 12. The sockets 32, therefore, in the preferred form of the present invention, are arranged in electrically interconnected pairs, as shown in FIG. 8, wherein a pair of adjacent inserts 34 and 36 are interconnected by a metal strap 38 which is also embedded in the plastic material forming the block 30.

In FIG. 10 the sockets in block 30 are identified by numerals 1–10. The straps 38 between the adjacent inserts are arranged so sockets 1 and 2 are electrically interconnected. Similarly, inserts electrically interconnect sockets 3—4, 5—6, 7—8, and 9—10.

The pin 37 shown in FIG. 12 includes a portion 38 to which the lead end of a wire 40 may be secured. The pin 37 has an end portion 42 which is slightly tapered and extends from a collar section 44. The collar section 44 is included on the pin 37 to provide an area whereagainst pressure may be applied for inserting and removing the pins 37 from the sockets 32 in either the top or bottom surfaces 30t and 30b. The tapered pins 37 are inserted into the sockets from the top surface 30t of the blocks 30 to form electrical connections between the various sockets. This is a preferred arrangement as it may be readily accomplished and eliminates the use of soldered connections more conventionally employed in electronic circuitry. The pins 37 also are secured to the components, i.e., resistors 16a, 16b, 16c, 18 and 26 and the terminal leads of the transistor to complete the circuits to sockets 1–10 as will be hereinafter described.

A second support comprising a printed circuit board 14, most clearly seen in FIG. 11, is formed in the conventional manner to have the conducting buses 13, 20, 22 and 28 extending along the bottom surface 14b. Extending between the top surface 14t and the bottom surface 14b of the board 14 are a plurality of spaced holes 46. These holes 46 extend through the conductors 13, 20, 22 and 28 and are located in a predetermined pattern to correspond with the sockets in the blocks 30. The conducting straps 20, 22 and 28 extend longitudinally over the entire length of the board 14, and the holes 46 located therein are arranged so that only one hole in each of the buses 20, 22 and 28 will be aligned with a socket 32 in one of the blocks 30. The bus 13 extends traversely on the board 14 and is arranged so four holes 46 will be aligned with four sockets 32 in each of the blocks 30. Thus when the resistors are to be assembled with the blocks 30 and the printed circuit board 14, a subassembly of resistors and transistors is formed as shown in FIG. 11, wherein the proper leads of transistor 10, the resistors 16a, 16b and 16c, 18 and 26, together with the collector and base leads of the transistor and the junction lead 12 are secured as by soldering to the wire receiving ends 38 of the tapered pins 37. When this is accomplished the tapered pins 37 are inserted in proper sockets in the blocks 30. For example: as shown in FIG. 7, the tapered pins connected to the resistance 16a is inserted in socket 2. The tapered pins associated with resistance 16b is inserted in socket 3. The tapered pin associated with resistance 16c is inserted in socket 5. The tapered pin associated with resistance 18 is inserted in socket 7 and the tapered pin associated with resistance 26 is inserted in socket 10. After the above is accomplished, the wire ends constituting the leads extending from the resistances 16a, 16b, 16c, 18 and 26 and the emitter lead 10e of the transistor are severed at an angle. This will permit the wire ends of the leads to be easily inserted into the openings 46 in the printed circuit board. At the conclusion of this operation an electrical connection between the leads on the resistors, etc., and the buses on the printed circuit board is established. This may be accomplished by immersing the printed surface of the printed circuit board 14 in liquid solder so that the leads are dip-soldered to the conductor buses 13, 22 and 28. Thereafter, the excess portions of the leads projecting above the solder are removed. Thus a unitary subassembly comprising; the printed circit board 14, the plurality of blocks 30 and the resistors and transistors is formed.

Figure 5:
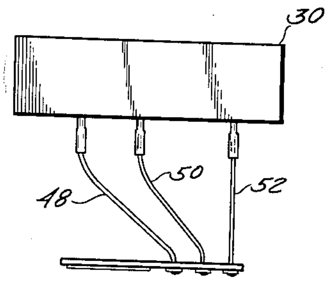
FIG. 5 is a view of one end of electric circuit components incorporating certain features of the present invention prior to encapsulation in the housing.
Figure 6:
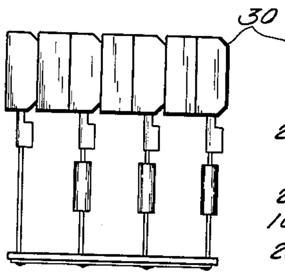
FIG. 6 is a side view of the assembly in FIG. 5.

As shown in FIG. 5, one of the blocks 30 and preferably the end block of the assembly of blocks 30, which is designated as block A in FIG. 2, is connected to the buses 20, 22 and 28 through leads 48, 50 and 52. The lead 48 which has a tapered pin secured thereto inserted in socket 2 of the end block 30, is connected with the bus 20. The lead 52 having a tapered pin secured thereto is inserted into socket 5 and has its other end inserted in bus 22 while the lead 52 having a tapered pin thereto connects socket 10 with bus 28. The sockets 2, 5 and 10 in block A when connected to a suitable source of external direct current will apply a potential to the buses 20, 22 and 28. As previously described, each of the individual NOR circuits of the assembly is connected to the buses 20, 22 and 28. For particular NOR circuit shown in FIG. 1, the bus 20 is connected to a positive voltage bias, i.e., 20 volts, and the bus 28 is connected to a negative voltage bias, i.e., −20 volts, while the bus 22 is common to each and therefore neutral. It is clearly apparent that a single power input to the end block A will thus serve a great plurality of NOR circuits.

Figure 4:
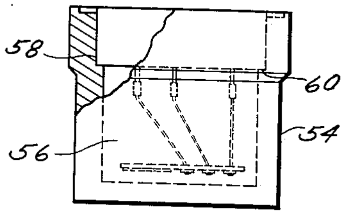
FIG. 4 is an end view of the assembly in FIG. 2 with a portion thereof broken away to illustrate the cooperation of the housing with the remaining devices included therein.

The assembly shown in FIG. 2 is provided with an enclosure or housing preferably formed of a suitable molded material to have a rectangular shape. The housing 54 is provided with an open cavity 56. Extending along opposite side walls of the cavity 56 are a pair of oppositely facing ledges 58 and 60, most clearly seen in FIG. 4. The ledges are arranged to engage the edges of the bottom surface 30b of the block 30 when the subassembly above described is positioned within the cavity. These ledges will maintain the subassembly consisting of the printed circuit board, the plurality of blocks 30 and the resistances and the transistor in position when the cavity 56 is filled with encapsulating material and will support the subassembly in the housing after encapsulation to prevent the damage to the components when the tapered pins are inserted into the sockets in the top surface 30t.

The encapsulating material used in the subassembly does not form one of the features of the present invention and may include any suitable well known material, such as an epoxy resin which solidifies in response to a catalytic action.

If desired, the portions of the housing adjacent the cavity may be suitably lettered, as shown in FIG. 2, to identify the particular NOR blocks 30 and thus facilitate the wiring of the electrical components of the particular NOR block in with other NOR block units. Further, if desired, the housing may be provided with suitable depressions 62 and 64 wherein nameplates or suitable indicia may be included to identify the particular electrical assembly from other similar assemblies which may be used in a logic system. As shown in FIG. 2, the blocks A, C, E and G are spaced from one another, by dummy blocks or spacers, B, D and F. If desired, the spacer blocks B, D and F may be replaced by blocks such as A, C, E and G which have associated therewith circuit components similar to the NOR circuit above described or other suitable electronic circuits which have components, i.e., resistors, transistors, which have leads respectively secured in the printed circuit board and the sockets of the block by means of tapered pins.

To illustrate the operation of the NOR circuit above described as previously indicated, the bus 20 is provided with a positive bias of 20 volts, the bus 28 is provided with a negative 20 volts, and the bus 22 is common to each. When a negative voltage pulse of sufficient magnitude is applied to any one of the input terminals T1—T6, which correspond to the sockets 1—6 in the blocks 30, the transistor 10 will be conductive. The negative voltage pulse may originate from any suitable source, not shown, which has its positive terminal connected through a suitable tapered pin 37 such as shown in FIG. 12, into sockets 6 so as to be interconnected with the terminal in the socket 5 by means of the strap 38 which was described in connection with FIG. 8. When the negative pulse is impressed on the terminals T1—T6, the bias at junction 11 will be overcome and the base 10*b* will become negative relative to the emitter 10*e*. When the negative input voltage pulse is not impressed on terminals T1—T6, the base 10*b* will be biased positive by the positive 20 volts through resistor 18. When this condition exists, the transistor 10 will be nonconductive, that is, there will be no emitter 10*e* to collector 10*c* current and the potential between junction 24 and ground as impressed on terminals T9 and T10 will be a negative 20 volts. However, when the transistor 10 is rendered conductive by a negative pulse applied to transistors T1—T6, the junction 24 will become less negative and approach the zero potential of bus 22 so that the terminals T9 and T10 likewise approach zero potential.

From the above it is clearly apparent that if an input signal, i.e., a negative voltage is present at T1—T6, then no signal will be present at terminals T9 and T10 and if no signal is present at T1—T6 then a signal will be present at terminals T9—T10. Stated in another manner, a signal at T1—T6 will not give a signal at terminals T9—T10, therefore the circuit is termed a NOR circuit which is a contracted form of the terms "not" and "or" and is particularly suited for use in logic circuits, and when incorporated into the assembly according to the present invention, will provide a component which is acceptable for industrial uses. The input and output signals aforementioned may be easily connected to other logic circuits by means of tapered pins 37 which are attached to suitable leads 40 as shown in FIG. 12. While this is a preferred form, it is manifest other forms of connections may be utilized to accomplish the external connection. For example, the female sockets 38, shown in the blocks 30, may be replaced by a male connector which in turn may be connected to wire leads by a female element or soldered thereto in the conventional manner without departing from the spirit of the present invention.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. An assembly of electric circuit components comprising: a plurality of individual identical elongated rectangularly shaped blocks stacked side by side in a row to provide a row of blocks, each of the blocks having a row of spaced electrically conductive pin receiving sockets extending between the top and bottom surfaces thereof, a printed circuit board in a plane parallel to and spaced from the row of blocks, said board having a plurality of spaced electrical conductors attached to a bottom surface and a plurality of openings extending transversely through the board into said conductors, said openings being spaced in rows at intervals equal to the spacing of and alignable with the sockets in the blocks when the blocks are placed side by side in a row, a plurality of electrical components arranged substantially perpendicular to the planes of said circuit board and row of blocks to maintain the blocks and board in a parallel spaced relation, said electrical components each having a pair of oppositely extending wire like terminal ends with one of said ends of each of the components extending through an opening in the board and electrically and mechanically secured to one of the conductors, a tapered pin secured to the other terminal end receivable in the sockets in the blocks for securing the other end of the components to the blocks to provide a subassembly consisting of the blocks, printed circuit board, electrical components and taper pins, a rectangularly shaped housing for the subassembly having an open rectangular cavity therein sized to receive the subassembly, a pair of ledges along opposite walls of the cavity engageable by the row of blocks for positioning the subassembly in the cavity and a thermosetting plastic insulating material filling the spaces in the cavity unoccupied by the subassembly to immovably secure the subassembly in the housing.

2. The combination as recited in claim 1 wherein adjacent pairs of sockets in the top surface are electrically interconnected.

3. The combination as recited in claim 1 wherein one of the conductors on the printed circuit board provides a common electrical connection for the components having terminal ends connected to tapered pins inserted in only one of the blocks and the remaining conductors are connected with electrical components having terminal ends connected to tapered pins inserted in sockets in all of the terminal blocks of said row of blocks.

4. The combination as recited in claim 3 wherein the sockets of one of said terminal blocks are connected only to the remaining conductors of the printed circuit board.

5. The combination as recited in claim 3 wherein the said one conductor is oriented in parallel spaced relation to the said one of the blocks and all of the said remaining conductors are oriented perpendicular to the said one conductor and extend over the entire length of the board.

6. The combination as recited in claim 1 wherein tapered pins are insertable in the sockets from the top surface of said blocks.

7. An assembly of electrical components, comprising: a first support having a plurality of electrical connectors thereon, a second support of lesser width than the first support and having a plurality of openings therein which are alignable with the connectors on the first support when the supports are in parallel planes in spaced relation to each other, a plurality of electrical components arranged substantially perpendicular to the planes of the supports for maintaining the supports in said parallel planes at a predetermined distance from each other, said components each having a pair of oppositely extending terminal wires which are respectively secured in the openings in the second support and the connectors of the first support, an enclosure having an open cavity therein sized to receive the first and second supports when the supports are maintained in spaced relation by the electrical components, said cavity having a bottom wall and a pair of parallel spaced side walls, a ledge on each of the side walls extending and located to engage and support the first support while permitting passage of the second support into the cavity and for maintaining the second support in spaced relation to the bottom wall, and a filling for the cavity for encapsulating the second support and electrical components in said enclosure.

8. In a method of making an electrical assembly the steps comprising: providing a pair of supports one of which has a plurality of rows of spaced electrical connectors thereon and the other of which has a plurality of rows of spaced openings alignable with the connectors when the supports are in parallel planes in spaced relation to each other, providing a plurality of electrical components each having oppositely extending wire like terminal ends, connecting one of the wire-like terminal ends of each component to the connectors and arranging the components so the other wire-like ends thereof extend in parallel spaced relation to one another, severing the extending wire-like ends so the extending wire-like ends in each row are of different lengths, progressively inserting all of the extending wire-like ends of different lengths through the openings beginning with the wire-like end having the greatest length, securing all of the extending wire-like ends in said opening while the supports are in the parallel planes, trimming the excess portions of the extending wire-like ends extending through the opening, positioning the supports and electrical components in a cavity in an enclosure so the surface of the support carrying the connectors remote from the components is exposed and finally filling the cavity with an encapsulating compound without covering said exposed surface.

References Cited in the file of this patent

UNITED STATES PATENTS

| | | |
|---|---|---|
| 2,703,377 | Hings et al. | Mar. 1, 1955 |
| 2,737,579 | Wehrlin et al. | Mar. 6, 1956 |
| 2,857,558 | Fiske | Oct. 21, 1958 |